United States Patent Office 2,891,243
Patented June 16, 1959

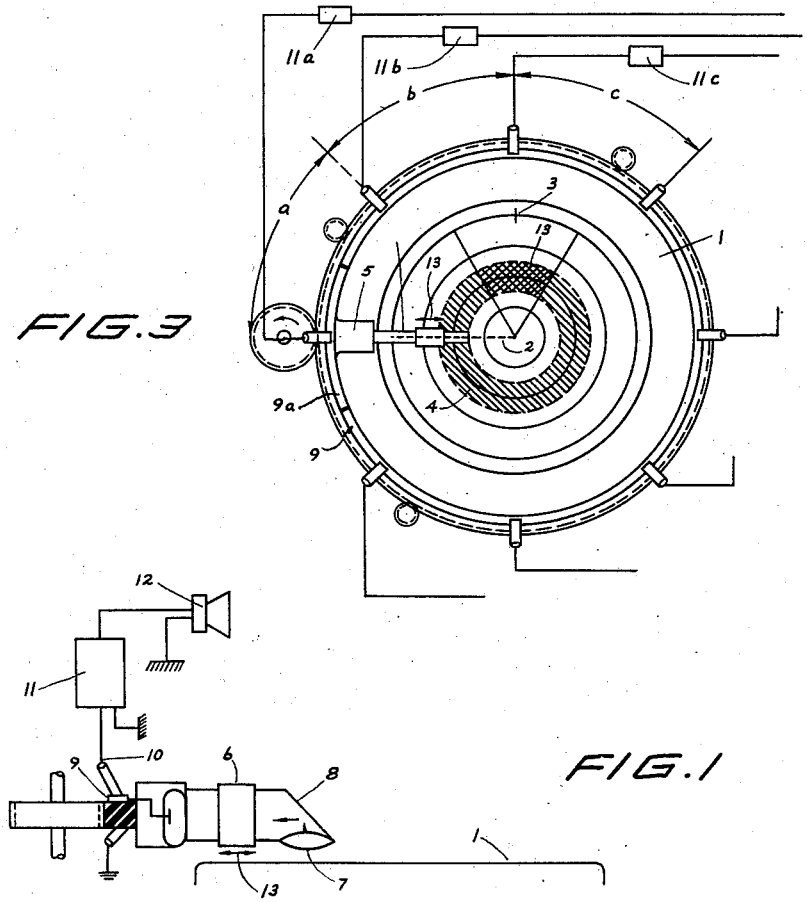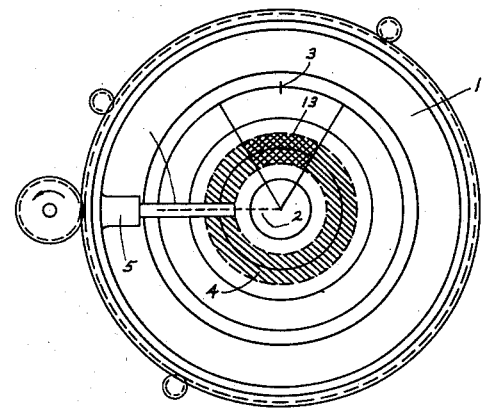

2,891,243

ALARM DEVICE FOR RADAR EQUIPMENT

Willy Kunze, Bremen, Germany, assignor to Atlas Werke Aktiengesellschaft, Bremen, Germany Application October 23, 1956, Serial No. 617,856

Claims priority, application Germany October 28, 1955

8 Claims. (Cl. 343—5)

The present invention relates to an alarm device for use in radar equipment. It is well known in acoustic echo sounding technique and in radar technique to provide, in addition to the optical indication of the received echo signals a device by means of which an alarm signal is released as soon as an echo signal is received from an object the distance of which is within a predetermined limit. The usual alarm devices of this kind operate with a special means which selects or picks out a time interval corresponding to a provided alarm range from each echo sounding period and which utilizes the echo signals coming in within this time interval to release the alarm signal. In the acoustic echo sounding technique time switches designed as a collector rotating in the sequence of soundings and equipped with a contact segment of a length of a semi-circle and with two brushes (see German Patent No. 904,386) which can be shifted within the circle and which limit the alarm range serves as a device for selecting or picking out the time interval. When taking soundings by means of electromagnetic waves such types of time switches with rotating contacts cannot be used owing to the extremely short propagation time. For radar equipment an electronic switch therefore has been provided in place of a mechanical one for the selecting of the desired alarm interval. Such an electronic time switch is, however, highly complicated in design and for this reason does not only require a lot of material and parts, but represents also an undesired source of disturbances.

It is the aim of the present invention to develop an alarm device which is remarkable in its simplicity and reliability for radar equipment. In order to solve the problem set forth above the invention utilizes the concept that no special device for the selecting of the time interval is required in order to establish an alarm range since the radar equipment itself already solves the problem of time resolution with a high degree of perfection in that the echoes reflected from the objects are visually indicated on a screen of a cathode-ray tube according to their distance and direction by luminous markings.

The idea of checking a corresponding time interval or range on the screen of a cathode-ray tube by an arrangement of photoelectric cells which is connected with an alarm system, is not subject to a ready and acceptable embodiment. One possible difficulty in such an arrangement of photoelectric cells is the substantial impairment of view of the image on the screen. According to this invention such an impairment of the view can be eliminated by a suitable and simple construction of an alarm device in that a photoelectric cell rotating in synchronism with the rotation of the antenna or the sweep is arranged in front of the screen which scans the annular zone of the screen which corresponds with the alarm range and which will be excited at the very moment at which the luminous marking lights up and thus will generate an electric pulse which in turn triggers the alarm signal after amplification by an amplifier. The supervision of the alarm range of the radar screen only at the spot of eventual development of a luminous marking only slightly impairs the view. The screening or masking of the sweep even offers the advantage that it protects the operator's eyes from the bright flashes caused by the generation of the luminous markings on the screen and thus facilitates the observation of the entire faint persistent image on the screen. Moreover, it is thus possible to obtain a very high sensitivity of the alarm indication. For alarm range a distance interval should suitably be selected which is outside the close range affected with numerous interferences. Moreover, elimination of interference for the alarm indication might be obtained in that the pulse generated by the photoelectric cell will actuate a counter and the alarm will not be released before the counter has received a definite number of pulses. In order to avoid the possibility that several pulses coming in from different directions may release the alarm signal, the device can be designed so that the alarm device will respond only when the counter will have received a definite number of pulses within time intervals which correspond to the speed of revolution of the antenna or of the photoelectric cell respectively. Finally, the influences of interference pulses might be reduced in that the efficacy of the alarm device is limited to a definite sector, especially to a sector coincident with the ship's heading.

The invention is illustrated with the following example:

Fig. 1 shows an alarm device according to this invention in schematic representation and in side elevation, Fig. 2 shows a top plan view of Fig. 1, and Figure 3 is a top plan view of modifications of the invention.

In the example as illustrated, 1 is the screen of the display tube of a radar equipment which represents the entire surroundings in polar coordinates. For this representation the electron beam of the cathode ray tube is deflected as usual from the centre of the screen in radial direction on each emission of a pulse so that the luminous marking or spot will travel from the center of the screen along a radius 2 to the periphery of the screen. Simultaneously, the sweep is slowly rotated about the center so that while pulses are emitted continually, the entire surface of the screen is swept once during one revolution of the antenna, starting with the ship's heading 3.

The velocity of the time sweep during each sounding period will be selected so that the luminous spot will travel from the center of the screen to the periphery during the time of propagation of the transmitting or echo pulses response across the entire range to be observed, e.g. 4 nautical miles. At the moment an echo signal is received the luminous spot will light up and the object will be thus indicated on the screen at a place which corresponds with its true position. In order to facilitate the observation it is possible that the cathode-ray itself might trace range circles indicating distances of one, two, three or four nautical miles on the screen of the cathode-ray tube.

In addition to the optical indication on the screen of the cathode-ray tube a device for the triggering of an alarm signal is provided which device will respond when echo signals are indicated in a pre-determined distance interval, e.g. between 1.5 to 2.5 nautical miles. This alarm range 4 is specially marked on the drawing by hatching. The alarm device works with an arrangement of a photoelectric cell 5 rotating on the screen synchronous with the antenna and sweep line 2. In order to minimize an impairment of the view of the cathode ray tube the arrangement of the photoelectric cell 5 is not arranged in front of the screen but laterally at the edge of the screen and scanning of the alarm range 4 by the photoelectric cell is made in that manner that the arrangement of the photoelectric cell is provided with a narrow radial arm 6 which is equipped with an optic system with lens 7 and a mirror 8 by means of which the flashes from the alarm range 4 are transmitted to the arrangement of the photoelectric cell. The arrangement of the photoelectric cell 5 with the arm 6 is rotating synchronous with the antenna and sweep line 2 of the radar screen so that the individual spots of the image will be transmitted by the optic system to the photoelectric cell at the moment at which these spots develop. Owing to this method the initial intensity of the individual image spot is utilized and a high sensitivity of the alarm device is obtained.

The echo pulses coming in from a range of 1.5 to 2.5 nautical miles, after having been converted into flashes in the cathode-ray tube, will thus be converted into electric pulses via the lens 7, the mirror 8 and the arrangement of the photoelectric cell 5. These pulses then will be conducted through a contact rail 9 and a brush 10 to a counter or a storage device 11 to which an acoustic alarm transmitter 12 is connected. The storage device or the counter is designed so that the alarm transmitter 12 can only be actuated when a definite minimum number of pulses will arrive from the alarm range 4 within a predetermined period of time. Owing to this arrangement a certain anti-interference protection or insensitiveness is attained with regard to interference pulses.

Another elimination of interferences can be obtained in that the efficacy of the alarm device is limited to a definite sector 13, e.g. the sector in the ship's heading of ±30° (port and starboard) as this is indicated on the drawing in the cross-hatched area. This can be, for instance, attained by arranging a contact rail 9 which is disposed symmetrically to the ship heading across the sector of 60°.

The invention is not limited to the example as illustrated; on the contrary, various modifications and other designs would be possible. For instance, the anti-interference protection can be improved in that the storage device 11 is made dependent upon direction in that separate storage elements 11a and 11b are provided for a certain number of electrically separate sectors a, b, c, associated with different directions so that each storage element will only receive pulses of one direction over contact rail 9a which, as indicated, has a limited length and alarm will only be released when several pulses will come in one after the other from a definite direction and in time intervals which correspond with the number of revolutions of the antenna or of the photoelectric cell respectively. As alarm range such a range should be suitably selected on the screen which is outside the close range affected by interferences. The alarm range may be suitably shifted by adjustment of the optic system 7, 8 in radial direction as indicated by pointer 13 by any suitable and well known means.

In case an additional image is derived by means of a semi-transparent mirror, the screen can be observed directly through the mirror and the reflected image can be used for the control of the rotating arrangement of the photoelectric cell or vice versa. With this arrangement the photoelectric cell might rotate within the range of the reflected image.

I claim:

1. In radar apparatus having a rotating antenna and a cathode ray tube on the screen of which a PPI-picture is produced by a sweep rotating about the center of the screen, an elongated light transmitting means having a receiving end disposed contiguously with the screen and a transmitting end, a photoelectric cell fitted to said transmitting end, means for rotating said transmitting means with the photoelectric cell attached to it about the screen center in synchronism with the rotation of the sweep line, the receiving end covering a rectangular area comprising a selected portion of the sweep line and sensitive to the light signals produced on said portion, slip-rings disposed concentrically with the screen and rotatable with the photoelectric cell, to which they are connected, fixed contacts slidable on said slip-rings, electrical relay means connected to said contacts and an acoustic alarm triggered thereby when light signals are produced at the receiving end of said transmitting means.

2. A device for use in connection with radar equipment having a cathode ray tube luminescently displaying information by means of a radially traversing electron beam rotating about the center of the tube screen comprising a narrow elongated light transmitting means having a receiving end positioned just above the screen and a transmitting end, a light transducer means operatively connected to said transmitting means at the edge of said screen, means for simultaneously rotating said transmitting and transducing means in operative synchronism with the movement of said sweep, said receiving end operatively sensitive to a selected area lying in an annular path on said beam, a signal means, and means operatively connecting said transducer means and signal means for actuation thereof when light signals are produced at the receiving end of said transmitting means.

3. A device as set forth in claim 2 wherein said means connecting the transducer and signal means includes means for preventing actuation of the signal means until a selected number of light signals within a selected time period have been received.

4. A device as set forth in claim 2 wherein said means connecting the transducer and signal means comprises a slip-ring concentric with said tube and rotatable with said transducer and transmitting means, contacts in slidable contact with said slip-ring, and an electric relay connecting said contacts and signal means.

5. A device as set forth in claim 4 wherein said transmitting means is radially adjustable to selected radial distances from the center of said screen.

6. A device as set forth in claim 2 wherein said light transmitting means comprises an elongated tube having a reflecting mirror angularly arranged at the receiving end.

7. A device as set forth in claim 6 wherein said transducing means comprises a photoelectric cell mounted at said transmitting end.

8. A device as set forth in claim 7 wherein said mirror is a semi-transparent mirror adapted to direct a portion of the light impinging thereon onto said photoelectric cell and transmit therethrough a portion.

References Cited in the file of this patent

UNITED STATES PATENTS 2,557,949     Deloraine _____ June 26, 1951